United States Patent [19]

Johnson

[11] 4,354,371
[45] Oct. 19, 1982

[54] METHOD OF PRESTRESSING THE WORKING SURFACES OF PRESSURE CHAMBERS OR CYLINDERS

[75] Inventor: Daniel E. Johnson, Dallas, Tex.

[73] Assignee: Metal Improvement Company, Inc., Paramus, N.J.

[21] Appl. No.: 200,767

[22] Filed: Oct. 27, 1980

[51] Int. Cl.³ .............................................. C21D 7/06
[52] U.S. Cl. ........................................ 72/53; 72/61
[58] Field of Search .................. 72/53, 40, 61; 148/4, 148/141; 29/421; 51/319

[56] References Cited

U.S. PATENT DOCUMENTS

| 454,592 | 6/1891 | Jackson | 72/61 |
|---|---|---|---|
| 3,485,073 | 12/1969 | Burney | 72/53 |
| 4,034,585 | 7/1977 | Straub | 72/53 |
| 4,214,923 | 7/1980 | Price | 29/421 R |
| 4,230,426 | 10/1980 | Avery | 72/53 |

Primary Examiner—Gene Crosby
Attorney, Agent, or Firm—Stephen A. Roen; Arthur L. Frederick

[57] ABSTRACT

A method of prestressing the working surface of pressure chambers or cylinders comprising the steps of first shot peening their working surfaces to form compressive residual stresses, and then applying fluid pressure at a predetermined magnitude to cause tensile stresses in the working surfaces. The magnitude of compressive residual stresses established on their outer working surfaces is made substantially equal to the tensile stress applied to these surfaces during the pressure phase of the process.

6 Claims, 2 Drawing Figures

METHOD OF PRESTRESSING THE WORKING SURFACES OF PRESSURE CHAMBERS OR CYLINDERS

BACKGROUND OF THE INVENTION

This invention relates to a method of increasing the fatigue life and preventing stress corrosion of metal parts and, more particularly, to a method of increasing the fatigue life and preventing stress corrosion of inner, working surfaces of pressure chambers or cylinders.

Still more specifically, the present invention has particular application to the fluid end portions or fluid chambers of positive displacement pumps, such as well service or mud pumps, which are used extensively in the petroleum industry in connection with exploration and drilling for petroleum. In such applications, the corrosion-fatigue environment of the fluid chambers of the positive displacement pumps is of particular concern especially when the operating pressures of the pump causes internal stress which approach or may exceed the yield strength of the materials used in their manufacture.

Shot peening and autofrettage are two recognized methods of achieving beneficial residual compressive stresses on the surface of metal components. The autofrettage process or method is to be understood to mean for purposes of this application the process of increasing the strength of the walls forming a closed or open chamber by the application of fluid pressure in the chamber of a magnitude sufficient to deform the walls beyond the yield strength but insufficient to cause fracture and thereafter relieving such fluid pressure. The shot peening and the autofrettage methods differ in the method of application and depth of residual compressive stress. With regard to the depth of residual compressive stresses achieved on the surface of a wall, shot-peening establishes a relatively shallow residual compressive stress, on the outermost surface of the wall of a predetermined depth, whereas autofrettage achieves a residual compressive stress of considerable depth which extends into the substrate approximately an order of magnitude greater than the depth achieved by shot-peening. Furthermore, in the case of autofrettage, such method is limited to a specific component configuration and only to the inner working surfaces of thick walled pressure chambers or cylinders. This limitation is due to the nature of autofrettage which requires that areas of high stress concentrations on the inner working surfaces are initially subject to an applied internal pressure sufficiently great so that they are stressed by expansion beyond their yield point but below that required for fracture. The other working surfaces, those that were absent areas of high stress concentrations, are also stressed and deformed, but not permanently since the loading, due to such applied autofrettage pressure, is below the point of loading at which the metal ceases to deform in direct proportion to stress. Then the applied pressure is released resulting in the formation of a residual compressive stress on the areas of high stress concentrations on the inner working surfaces. While such component part is subject to such a high internal pressure there is at least a circumferential tension component and a radial compression component at any radius, the circumferential tension generally diminishing in the body of the substrate material from the inner surface of the wall of the chamber to the exterior surface of the part and is at a maximum therein at a radius separating the plastic from the elastic zone in said substrate. This tension component, unless neutralized, can produce microscopic fractures in the internal surface of the chamber wherein defects exist therein. These cracks act as nucleation sites for failure in a corrosion-fatigue environment such as may exist in the fluid chambers of positive displacement pumps.

Shot peening is a process in which compressive stresses are induced in the upper layer or exposed surface layers of metallic parts by the impingement of a stream of metal or glass shot, directed at the metal surface at high velocity and under controlled conditions, whereby increased fatigue strength and resistance to stress corrosion is imparted to the workpiece. When shot peening is performed properly, there is established a predictable amount of residual compressive stress at the peened upper layer or exposed surface layers of the metallic part and which extends for a relatively shallow depth therein; residual tensile forces are established in the region below the upper layer in the body of the substrate which upper layer is in compressive stress.

It is, therefore, an object of this invention to provide a method of increasing the fatigue life and preventing stress corrosion of inner, working surfaces of pressure chambers or cylinders.

Another object of the present invention is to provide an improved method which utilizes autofrettage but which substantially obviates the formation of fractures during the autofrettage portion of the process.

A further object of the present invention is to provide a method which utilizes autofrettage but substantially, effectively neutralizes the deleterious effect of the applied tensile component on the upper layer of the metallic part during the pressure phase of the autofrettage process.

A still further object of the present invention is to provide an improved method which includes the process of autofrettage but which lessens, if not eliminates, the propensity of material subjected thereto to crack due to the pressures required to perform said autofrettage process thereon.

SUMMARY OF THE INVENTION

Accordingly, the present invention contemplates a method of prestressing the inner working surfaces of pressure chambers or cylinders comprising the steps of first shot peening these working surfaces and then autofrettaging these working surfaces. In a more narrow aspect of this invention, these working surfaces are first peened to achieve a desired predetermined magnitude of compressive residual stress on their inner working surfaces and during the next step, autofrettage, these working surfaces are subjected to a predetermined magnitude of tensile stress on their inner working surfaces, the magnitude of the compressive residual stress being substantially equal to the magnitude of this tensile stress.

In a still narrower scope of this invention, these working surfaces are first peened to achieve a desired predetermined magnitude of compressive residual stress on the upper layer of their inner working surfaces and during the next step, autofrettage, and during its pressurizing phase these working surfaces are subject to a predetermined magnitude of tensile stress, the compressive residual stress on the outer layers effectively, substantially, neutralizing said tensile stress.

BRIEF DESCRIPTION OF THE DRAWING

The invention will be more fully understood from the following description when considered in connection with the accompanying drawings in which.

DESCRIPTION OF THE PREFERRED EMBODIMENT

The method, according to this invention, of prestressing the inner working surfaces of pressure chambers or cylinders, and in particular the fluid end portions of well service or mud pumps, which are used extensively in the petroleum industry, to significantly increase their useful life in fatigue and corrosion-fatigue is as herein set forth.

Initially, the inner working surfaces of the fluid end portions of such a pump are conventionally shot peened to achieve a desired predetermined magnitude of compressive residual stress and the desired predetermined depth of compressive residual stress. Shot peening is well known in the art and in this regard reference is made to, for example, the sixth edition of "Shot Peening Applications" published by Metal Improvement Company, the assignee, in 1980, and the method disclosed in U.S. Pat. No. 3,485,073 to Burney, dated Dec. 23, 1969, the relevant portions of which are incorporated herein by reference. FIG. 6, in the aforementioned publication illustrates qualitatively the distribution of stress in a member which has been shot-peened on its outer surface which member is not under any external load. Since the member is in equilibrium with no external forces, the area under the stress distribution curve in the regions of compressive stress must be equal to the corresponding area under the curve in the region of tensile stress. Furthermore, the peened surface or working surface of the member has its maximum, predetermined, compressive residual stress, located at or near its outer surface, and this magnitude of stress and stresses of comparable intensity extend a predetermined depth in the body of the substrate material before the magnitude of the stress significantly decreases. This predetermined depth wherein such a gradient of residual compressive stress is established extends within what is referred to as the "outer layer" of said working surface and its boundaries are coextensive therewith; that is the thickness of the outer layer and the predetermined depth are equal.

Figure 1:
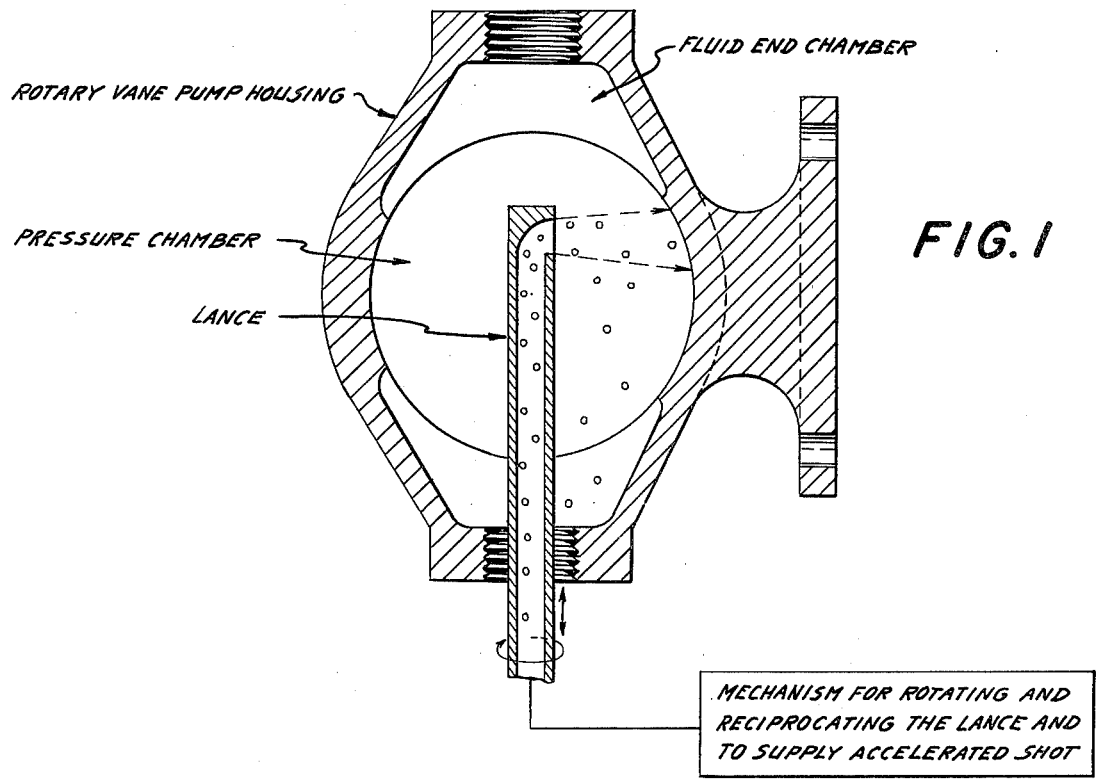
FIG. 1 is a cross sectional and somewhat schematic view of a vane type pump housing being subject to shot peening in accordance with the method of this invention and FIG. 2 is a view similar to FIG. 1 showing the same vane type pump housing being subjected to the autofrettage process in accordance with the method of this invention.
Figure 2:
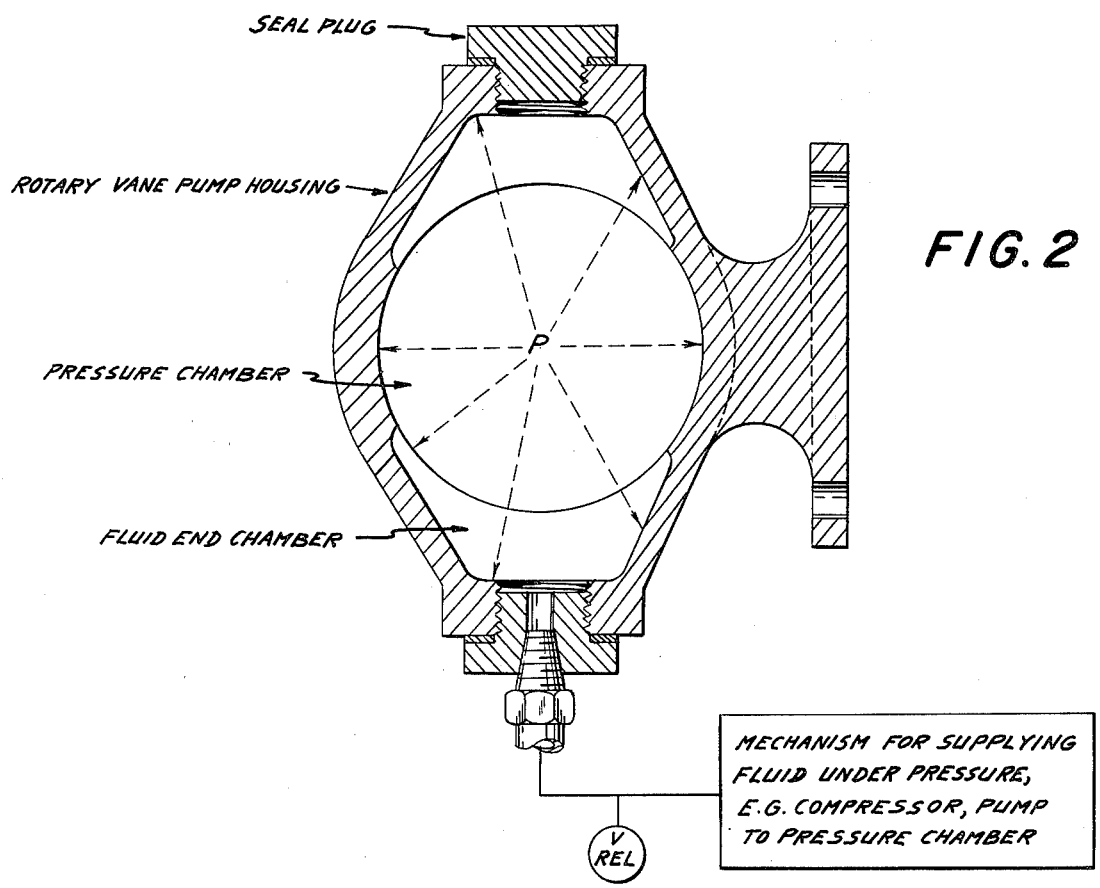

After this shot peening process is performed on the inner working surfaces of the fluid end chambers, they are then subjected to the autofrettage process. This process initially requires subjecting the inner working surfaces of the chambers to a pressure sufficiently great so that only areas of high stress concentration on the working surfaces are stressed by expansion beyond their material yield strength but at an internal pressure which is insufficient to fracture or break any of these highly stressed areas particularly those that exist at the bore intersections of the fluid end chambers. The other working surfaces, those that were absent areas of high stress concentrations, are also stressed and deformed, but not permanently since the loading due to such applied autofrettage pressure is below the point of loading at which the metal ceases to deform in direct proportion to stress. After deformation occurs in tension under the applied autofrettage pressure, these other working surfaces are normally in tension; that is, they are at a predetermined magnitude of tensile stress at their outer layer and the layer beneath it, referred to as the "inner layer" which inner layer is approximately an order of magnitude greater in thickness than the outer layer, which stress decreases as a function of the distance away from the outer surfaces but which is relatively constant within the outer layer, all in the absence of the previous shot-peening process. Since the previous shot-peening step established a compressive residual stress of a predetermined magnitude on only these outer layers of the same inner working surfaces now subject to the applied autofrettage pressure and the resulting applied tensile stress thereon, it is believed such tensile stresses that would have been established on these outer layers of the working surfaces during this phase of autofrettage will be effectively, substantially, neutralized as they will be negated or at least minimized if the magnitude of the compressive residual stress established during the previous shot-opening step is made substantially equal to or slightly less than the applied tensile stress of antofrettage. However, the inner layers which were not under residual compressive stresses of shot peening, because they were below the depth at which such stress could be established, will be fully in tension. After local yielding occurs in the material where there are areas of high stress concentrations, then the applied pressure is released. This results in the creation of a residual compressive stress of considerable depth on the high stress concentration areas of the inner working surfaces of the chambers and also a residual compressive stress on the other working surfaces but only on their outer layer. On FIG. 2 is shown how the autofrettage process can be practiced on a vane type pump housing and wherein sealing of the working chamber is accomplished by plugs secured in the inlet and outlet ports of the pump housing.

Accordingly, it is believed that the present invention provides a method which utilizes autofrettage but which neutralizes the deleterious effect of the applied tensile component during the pressure phase of the autofrettage process on the outer layers of the other working surfaces, those surfaces which did not have areas of high stress concentration.

Although but one embodiment of the invention has been described in detail, it is to be expressly understood that the invention is not limited thereto. Various changes may be made in the method steps without departing from the scope and spirit of the invention as the same will now be understood by those skilled in the art.

What is claimed is:

1. A method of prestressing the inner working surfaces of the walls forming a pressure chamber comprising the steps of:
   (a) shot peening the inner working surfaces of said walls of said pressure chamber;
   (b) sealing said pressure chamber and applying a fluid pressure in the chamber of a magnitude sufficient to deform the said walls defining said chamber beyond the yield strength but not sufficient to cause fracture of said walls, and
   (c) releasing such applied fluid pressure and unsealing said pressure chamber.

2. The method of claim 1 wherein the outer layers of said inner working surfaces of the pressure chamber is shot peened to a desired predetermined intensity.

3. The method of claim 1 the outer layers of said inner working surfaces of siad pressure chamber are shot peened to achieve a desired predetermined magnitude and predetermined depth of compressive residual stress.

4. The method of claim 1 wherein said outer layers of said inner working surfaces are subjected to said shot peening of an intensity to provide a compressive residual stress in said outer layers, and, wherein the outer layers of said inner working surfaces of said pressure chamber are subjected to a fluid pressure of a predetermined magnitude to apply in the walls defining the pressure chamber a predetermined magnitude of tensile stress of a value substantially equal to the magnitude of the compressive residual stress.

5. The method of claim 4 wherein said tensile stress is circumferential.

6. The method of claim 1 wherein said shot peening intensity and said fluid pressure are selected such that the tensile stress in the outer layer of working the surfaces of the walls of said pressure chamber is substantially neutralized by the tensile stress on the outer layers of the working surfaces of the walls achieved by the fluid pressure.

* * * * *